(12) United States Patent
Krämer et al.

(10) Patent No.: US 6,616,764 B2
(45) Date of Patent: Sep. 9, 2003

(54) POWDER COATING BOOTH WITH A CLEANING DEVICE AND METHOD

(75) Inventors: Erich Krämer, Michelau (DE); Matthias Krämer, Michelau (DE)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 10/016,561

(22) Filed: Oct. 30, 2001

(65) Prior Publication Data

US 2002/0050245 A1 May 2, 2002

Related U.S. Application Data

(63) Continuation of application No. PCT/EP00/03972, filed on May 3, 2000.

(30) Foreign Application Priority Data

May 4, 1999 (DE) .......................................... 199 20 466

(51) Int. Cl.$^7$ ............................................. B05B 001/28
(52) U.S. Cl. ...................... 118/326; 118/308; 427/421; 454/50
(58) Field of Search ................................. 118/326, 634; 454/50, 53; 427/421

(56) References Cited

U.S. PATENT DOCUMENTS

| | | | |
|---|---|---|---|
| 4,770,118 A | * 9/1988 | Vohringer et al. | 118/312 |
| 5,056,459 A | 10/1991 | Urban et al. | |
| 5,961,746 A | * 10/1999 | Nepela | 148/304 |
| 6,187,098 B1 | * 2/2001 | Kramer et al. | 118/326 |

FOREIGN PATENT DOCUMENTS

| | | |
|---|---|---|
| CH | 560 558 A | 4/1975 |
| DE | 35 16 826 A | 11/1986 |
| DE | 92 03 366 U | 8/1992 |
| DE | 196 16 220 A | 10/1997 |
| EP | 0 745 430 A | 12/1996 |
| JP | 07088405 A | 4/1995 |
| JP | 07116570 A | 5/1995 |
| WO | WO 96/12568 | 5/1996 |

* cited by examiner

Primary Examiner—Richard Crispino
Assistant Examiner—Michelle Acevedo Lazor
(74) Attorney, Agent, or Firm—Calfee, Halter & Griswold LLP

(57) ABSTRACT

A method for cleaning an interior of a coating booth is proposed in which blast air is used as at least one of the means for cleaning. For primary cleaning of the coating booth, blast air and corresponding suction operations are used, whereby blowing and suction can be carried out simultaneously, cyclically or sequentially. The invention also relates to a coating booth. The floor and/or the ceiling of the coating booth are formed by a separate floor part and/or a ceiling part which are movable relative to the peripheral wall. The floor part and/or the ceiling part include a cleaning device which can optionally be integrated with the respective floor part and/or ceiling part. The floor part and/or the ceiling part hence operate as a cleaning device for the coating booth. The cleaning device can be displaced in the interior space of the coating booth in a longitudinal direction.

24 Claims, 6 Drawing Sheets

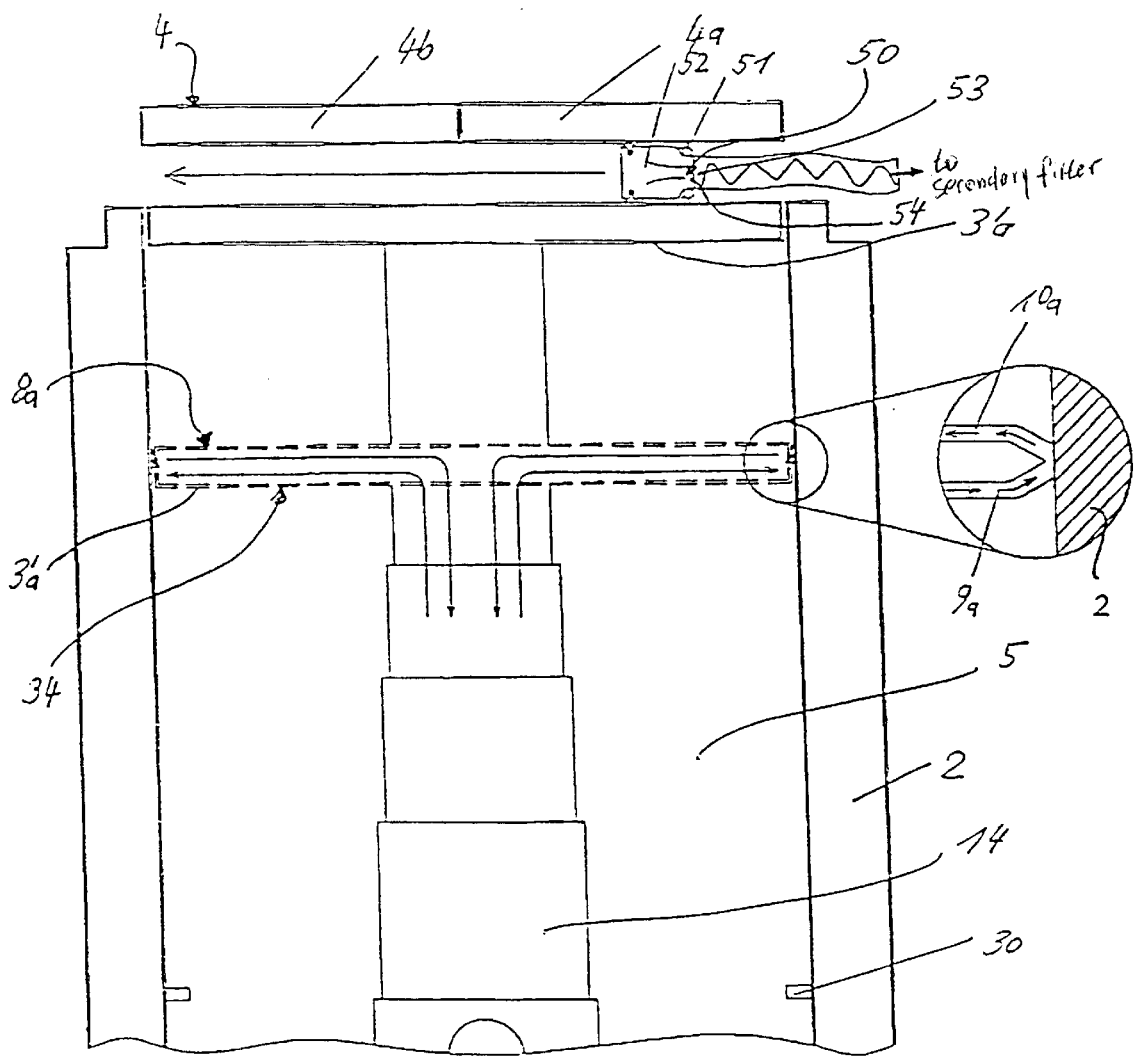

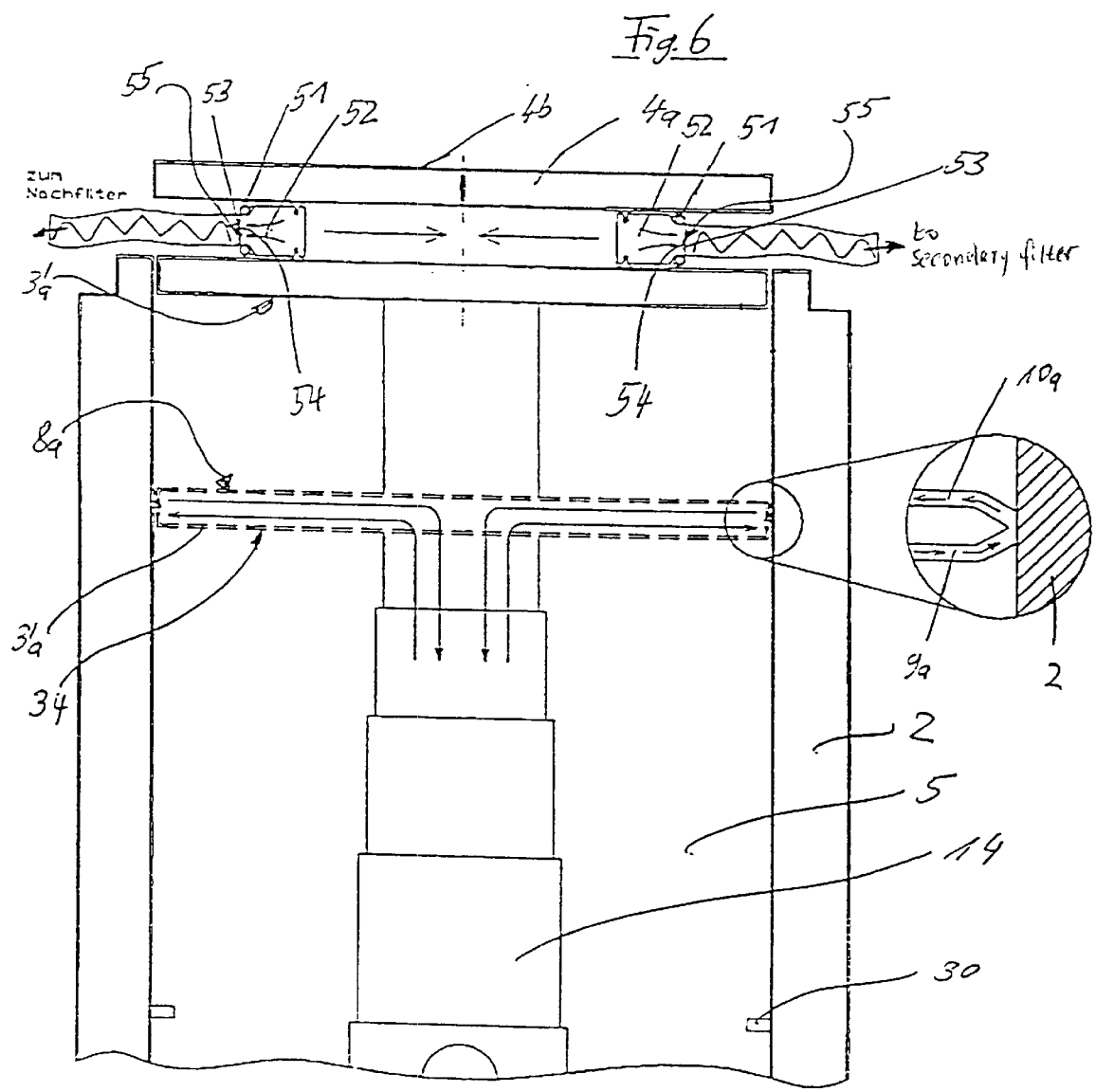

POWDER COATING BOOTH WITH A CLEANING DEVICE AND METHOD

CROSS-REFERENCES TO RELATED APPLICATIONS

This application is a continuation of prior filed copending PCT International application no. PCT/EP00/03972, filed May 3, 2000.

This application claims the priority of German Patent Application Serial No. 199 20 466.7, filed May 4, 1999, the subject matter of which is incorporated herein by reference.

BACKGROUND OF THE INVENTION

The present invention relates especially but not exclusively to a method for cleaning an interior space of a coating booth, in particular a powder coating booth, as well as to a novel design of a cleaning device for such coating booth.

WO 96/12568 discloses a powder coating booth with an interior space which is bounded by a preferably jacket-like peripheral wall, a floor and a ceiling. This coating booth includes a cleaning device which is capable of cleaning the interior space of the powder coating booth by moving in a vertical direction. During the coating operation, this cleaning device is kept ready for use outside the coating booth and can be introduced in a suitable manner into the interior space of the coating booth to clean the interior space of the powder coating booth, and can then clean the entire powder coating booth by moving in a vertical direction. The cleaning device, when not in use, requires storage space near the powder coating booth which adversely affects the compactness of the design of the powder coating booth.

It would therefore be desirable and advantageous to provide an improved method for cleaning an interior space of a coating booth, in particular a powder coating booth, as well as a coating booth, in particular a powder coating booth, to obviate prior art shortcomings and of a configuration which is compact and yet is reliable in operation to clean the effectively and essentially automatically.

SUMMARY OF THE INVENTION

According to one aspect of the invention, a method is provided for cleaning an interior space of the coating booth, in particular a powder coating booth, with an air-supported cleaning device and optionally a recovery device as well as a suction device extending in a longitudinal direction of the booth. The method provides that, if powders of an identical or similar color are employed, then blast air is blown against the surfaces of the interior space of the booth to be cleaned and thereafter directed towards a recovery device. Such cleaning method is particularly suited for a coating operation with a color change "tint-in-tint", since in this case, due to the small difference in tint of the color powder, the excess powder needs to be cleaned off from the interior space of the booth only coarsely before being transported to the recovery device for reuse. To discharge the excess powder to the recovery unit, a conventional slotted suction device can be used. The conventional device is typically intended to operate only briefly in the coating booth and preferably extends in the longitudinal direction of the booth.

According to a different embodiment of the method for cleaning the interior space of the coating booth, in particular a powder coating booth, with an air-supported cleaning device, optionally also with a recovery device as well as a suction device extending in the longitudinal direction of the booth, blast air is blown against the surfaces of the interior space of the booth to be cleaned for a primary cleaning, for example during a color change, and again suctioned off, and optionally transferred to the recovery device or to a secondary filter. With such an embodiment of the method, steps are carried out simultaneously or alternatingly, wherein blast air is directed to the surfaces of the interior space of the booth to be cleaned and optionally suctioned off with a corresponding additional suction device, which can be provided in addition to the suction device that extends in the longitudinal direction of the booth. The blast air herein blows the powder particles off the corresponding wall surface of the interior space, and the released powder particles are then withdrawn from the interior space of the booth by suction as closely as possible to the release location. By combining the blowing and suction operation, the cleaning process is extremely effective and complete.

According to a preferred embodiment of the method, blast air with a certain pressure is first blown against the surfaces of the interior space of the booth to be cleaned, and the powder particles released by the blast air are subsequently suctioned off while the supply of blast air to the interior space of the booth is stopped. It will be understood that the order of the operation can also be reversed. Moreover, cleaning by alternatingly blowing and suctioning can also be carried out several times. The corresponding processes can be suitably adapted to a particular application.

According to an alternative embodiment of the method, blast air is blown against the surfaces of the interior space of the booth to be cleaned and simultaneously suctioned off, preferably at a different location from the blast air. According to a modification of the cleaning method of the invention, the blast air can be supplied and suctioned off simultaneously.

In all the aforedescribed cleaning methods of the invention, the blowing and/or suction operation can be performed cyclically, optionally several times. The process for a respective cycle is herein selected from previously obtained empirical values and by taking into account the economical impact of the cleaning method.

According to another embodiment, blast air is introduced intermittently or pulse-wise, in order to enhance the release of powder particles from the corresponding surface to be cleaned.

In particular, the blast air can be supplied under a controllable high pressure. In this way, the blast air only needs to be directed during a relatively short time to the respective surfaces of the interior space of the booth to be cleaned. This reduces the time required for carrying out the cleaning method of the invention, thereby significantly reducing the necessary downtime of the booth for cleaning.

Preferably, the cleaning method of the invention also provides that the supply of blast air is discontinued during the coating operation and that the air is withdrawn from the interior space of the booth through the floor and/or a side outlet extending in the longitudinal direction of the booth.

According to another aspect of the invention, a coating booth, in particular a powder coating booth, is provided which has a peripheral wall, a floor and a ceiling that cooperatively bound an interior space. The interior space can be cleaned with a cleaning device moving in a vertical direction. The floor and/or the ceiling of the coating booth are in the form of segments that are separate from the peripheral wall and also include the cleaning device.

The floor and/or the ceiling therefore also support the cleaning device. Alternatively, the cleaning device can be integrated in the floor section and/or the ceiling section. The coating booth of the invention does not require additional storage space for a cleaning device, since the floor section and/or the ceiling section themselves perform the cleaning by moving in a vertical direction. Accordingly, such coating booth can have very compact design and be advantageously employed when installation height and space are limited. Moreover, the appropriate facilities for the cleaning device as well as the appropriate drive units for moving the cleaning device to perform cleaning tasks can also be installed at suitable locations in the powder coating booth. Depending on the height of the booth or other limitations, it may be sufficient to employ for cleaning only the floor section or the ceiling section of the cleaning device; however, but it would also be possible to simultaneously or alternatingly use both the ceiling section and the floor section for cleaning. If both the floor section and the ceiling section are provided with a cleaning device, then one of the cleaning devices could be used for blowing and/or suction, while the other cleaning device could be designed as a fine cleaning device, to be used, for example, for wiping with a sponge or the like. Of course, optionally one of the cleaning devices can also be implemented as a pre-cleaning device.

For cleaning the interior space of the coating booth, the floor section and/or the ceiling section are moveable in a vertical direction, so that the entire interior space is attended to by the cleaning device and then cleaned. If both the floor section and the ceiling section are equipped with a cleaning device, then the distance traveled by these sections in the vertical direction can be reduced during cleaning, so that the cleaning operation can be performed faster, permitting a color change in an economical and effective fashion with less downtime.

Preferably, each cleaning device includes a blowing device and a suction device. The blowing device and suction device are preferably spaced apart from one another in an axial direction. Advantageously, the suction device and the blowing device are close to one another, so that the powder particles released from the interior wall by the blowing device reach the suction device on the shortest possible path, and the particles then reach the filter and cyclone device and optionally also the recovery device connected after the suction device. The blowing device can be used to direct an air jet onto the appropriate wall regions of the powder coating booth so as to support a complete release of the powder adhering to the wall surfaces and to move the released powder to the suction device.

The forward region of the cleaning device, as viewed in the movement direction, can be implemented as the blowing device, and the trailing region as the suction device. This arrangement can also be reversed. It is important that the blowing device and the suction device are arranged as closely as possible, so that the powder released from the wall surfaces travels the shortest possible path to the suction device.

Suitably, the blowing device and the suction device associated with the floor section may be formed as a nozzle plate, with the suction on the corresponding peripheral wall section occurring in the immediate vicinity of the impact region of the blast air. With this arrangement, the corresponding peripheral regions of the interior space of the booth can be cleaned effectively by preventing the powder that has been removed from the surface by the blast air to re-enter those areas of the booth that have already been cleaned. In addition, the cleaning device associated with the floor section can have a compact design, in particular a small height.

Suitably, the blowing device may include several nozzles which are distributed along the periphery and direct the blast air against the wall surface of the booth to be cleaned. The blowing device preferably also includes several suction openings which are also distributed along the periphery. The powder released from the wall surface of the booth by the blast air can reach the suction openings on the suction device via the shortest possible path. In another words, the cleaning device can clean the interior space of the booth completely and efficiently within a very short time. This ensures a very economical operation when coating articles, in particular in continuous operation.

Advantageously, in addition to the floor section and/or ceiling section, a sealing element can be provided which provides a reliable seal during the coating operation and also prevents powder particles from being released into the environment when the floor section and/or the ceiling section move vertically during the cleaning operation.

The bottom section and/or the ceiling section may includes several segments which can be moved relative to one another. In such an embodiment, the segments of the floor section and/or the ceiling section can be moved towards one another, thereby reducing their outside dimensions. In this arrangement, the sections can clean the inside of the booth in the vertical direction as intended. More particularly, the segments of the ceiling section of those booths that have in their ceiling section a through-slot for passage of a suspension gear of a conveyor, can be reliably sealed during the coating operation by their own weight and by making contact with the associated boundary of the peripheral wall. These segments are moved towards each other during cleaning and hereby assume dimensions that make it possible for them to move in the interior space of the coating booth in the vertical direction, thereby permitting the cleaning operation to take place.

In an advantageous embodiment of the coating booth of the invention, the blowing device associated with the ceiling section has the form of a blowing ring adapted to the cross-section of the coating booth, wherein the blowing ring can be arranged to face the interior space when the segments of the ceiling section are closely spaced.

The blowing device can have nozzles with corresponding nozzle exit openings arranged in the circumferential direction, which are constructed in such a way that blast air can be used to simultaneously, reliably and quickly clean the ceiling section and optionally the floor section.

In one embodiment wherein only the floor section is moveable in the interior space of the cabin, an actuating device which moves the segments of the ceiling section towards one another for cleaning and optionally lifts the segments slightly away from the upper edge of the peripheral wall, can be associated with a ceiling section of the aforedescribed embodiments. Advantageously, the actuating device can be implemented in form of an articulated lever mechanism. An actuating device of this type can be used to move the two segments of the ceiling section, on one hand, into a cleaning position and, on the other hand, into an operating position for performing a conventional coating operation. It will be understood is that corresponding suction devices can be associated with the ceiling segments.

Additional conventional seals can optionally be provided in the regions between the moveable ceiling sections and/or floor sections to ensure that in a typical coating operation, the interior space of the booth is reliably sealed by the ceiling section and/or the floor section.

In particular, if the ceiling section includes two segments, then separate blowing and suction devices can be associated with each segment. However, the segments can also be constructed so that in a closely spaced position, the device for blowing and the device for suction are both associated with the two segments. The corresponding supply and discharge lines are then provided eccentrically only on one segment of the ceiling and/or floor section.

The corresponding hose and pipe connections to the cleaning device are, of course, constructed so that they can follow the movement of the floor section and/or the ceiling section without impediment. For example, tubular sections that move inside one another in a telescopic fashion can be used for the suction device or the like, and the hose connection that supplies, for example, blast air can initially be wound up on a hose reel and is withdrawn from the hose reel during the vertical movement for cleaning. This design prevents the back and forth vertical movement of the supply lines from obstructing the cleaning operation.

Suitably, controllable flaps adapted for connection to subsequent cyclone devices, secondary filters device and/or recovery devices may be provided in a region of the suction devices. During cleaning, in particular during a color change "tint-in-tint", the suction device associated with the floor section and/or ceiling section can be decoupled by placing the flap of the flap arrangement in a closed position. In this way, the suction device which extends predominantly in the longitudinal direction of the booth and is typically present in the interior space of the cabin during the coating operation, can be used to return to the removed powder directly to the recovery device. It will be understood that additional flaps can be arranged in the region of the suction device to suitably divert the removed powder.

In addition, the invention provides a coating booth of the aforedescribed type, which according to an alternative embodiment is constructed so that at least one ceiling cleaning device is associated with the ceiling section, with the ceiling cleaning device including compressed air nozzles for blowing off the adhering powder and at least one suction device disposed in the ceiling cleaning device for the blown-off powder, wherein the ceiling cleaning device in its end position cleans the entire space between the ceiling section and the floor section. With this arrangement, a self-sufficient ceiling cleaning device is provided which is arranged for longitudinal movement in the space between the ceiling section and the floor section and which does not require additional devices on the ceiling section, such as suction devices and the like. This does not only reduce the complexity of the construction of the coating booth, but also allows a reduction of the building height of the coating booth.

The ceiling cleaning device may include one or more suction hoses which are preferably controllably connected to a secondary filter of a powder recovery device, in particular with control provided by flaps.

The ceiling cleaning device provided according to the previous alternative embodiment of the coating booth is preferably arranged in the space between the ceiling section and the end position of the floor section. The ceiling cleaning device can move in a longitudinal direction, preferably using a telescopic rail, and can therefore be moved in this space in a manner so as to enable cleaning of the entire ceiling and floor section. The ceiling cleaning device blows air against the associated ceiling and floor regions through compressed air nozzles. The blown-off powder is immediately suctioned off via the suction device of the ceiling cleaning device and optionally transported to the secondary filter of a recovery device.

According to another embodiment, the ceiling cleaning device can include two cleaning units, which include compressed air nozzles and suction devices and which each clean only the associated half space between the ceiling section and the floor section. In all other aspects, the cleaning units can be designed so as to include all the detailed features of the ceiling cleaning device.

In summary, the invention provides a method for cleaning an interior space of a coating booth, wherein at least blast air is employed for removing the powder particles. In a primary cleaning operation with a complete color change, blast air is advantageously employed in combination with a corresponding suction, wherein blowing and suction can be carried out simultaneously, depending on the application. Blowing and/or suction can also optionally be performed cyclically several times, with the blast air preferably supplied intermittently or pulse-wise. Advantageously, the cleaning process can be accelerated by supplying blast air with an adjustable high-pressure.

In an inventive embodiment of a coating booth, in particular a powder coating booth, with a cleaning device, it is significant that the cleaning device forms simultaneously the floor section and/or the ceiling section of the booth during the coating operation, while for cleaning purposes being able to move in a vertical direction along the interior wall surface of the booth. Accordingly, the floor section and/or the ceiling section can simultaneously perform several functions, thereby eliminating the need for additional storage space outside the coating booth for a separate cleaning device. As a result, the coating booth can be compact and capable of automatically cleaning the interior space of the booth.

BRIEF DESCRIPTION OF THE DRAWING

Other features and advantages of the present invention will be more readily apparent upon reading the following description of a preferred exemplified embodiment of the invention with reference to the accompanying drawing, in which:

FIG. 5 is a longitudinal cross-sectional view similar to that of FIG. 4 of a modified embodiment of a ceiling cleaning device; and FIG. 6 is a longitudinal cross-sectional view FIG. 5 of a modified embodiment of the ceiling cleaning device similar to that of FIG. 5.

DETAILED DESCRIPTION OF PREFERRED EMBODIMENTS

Figure 1:
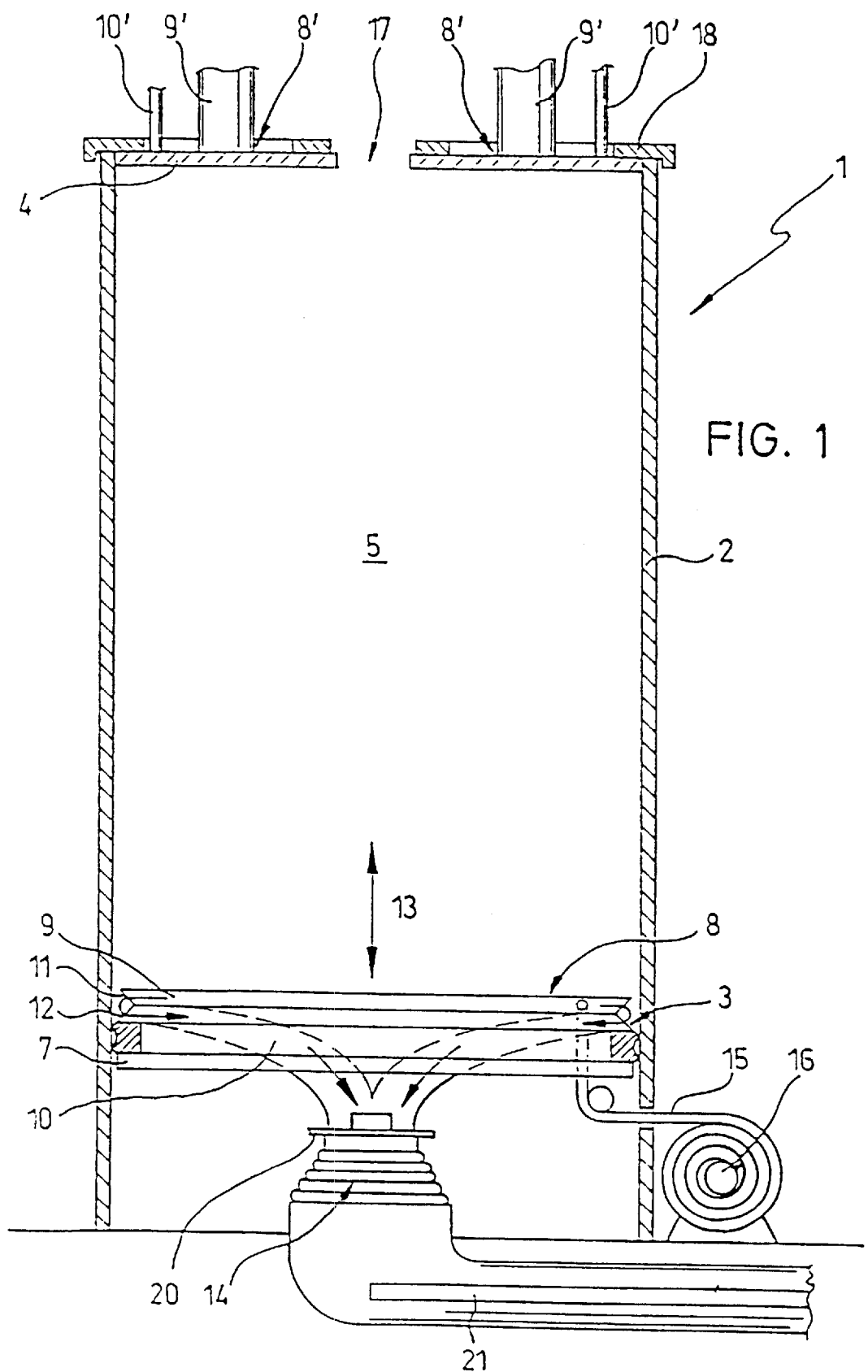
FIG. 1 is a schematic sectional view of a coating booth according to the present invention.

In the Figures of the drawing, the reference numeral 1 designates in general a coating booth, in particular a powder coating booth. Such powder coating booth 1 includes powder spray devices (not shown), as well as powder processing and supply devices for the powder coating operation (also not shown). The powder coating booth 1 has a preferably jacket-shaped peripheral wall 2, a floor section 3 and a ceiling section 4. The peripheral wall 2 in conjunction with the floor section 3 and the ceiling section 4 bound an interior space 5 of the coating booth 1.

Although not shown in detail, a coating booth 1 can also have, for example, only a single floor section 3 or a single ceiling section 4 that is separate from the peripheral wall 2. This is meant to illustrate that embodiments of coating booths 1 could also be considered where the floor or the ceiling is formed in a conventional manner and rigidly connected to a respective end of the peripheral wall 2.

Figure 2:
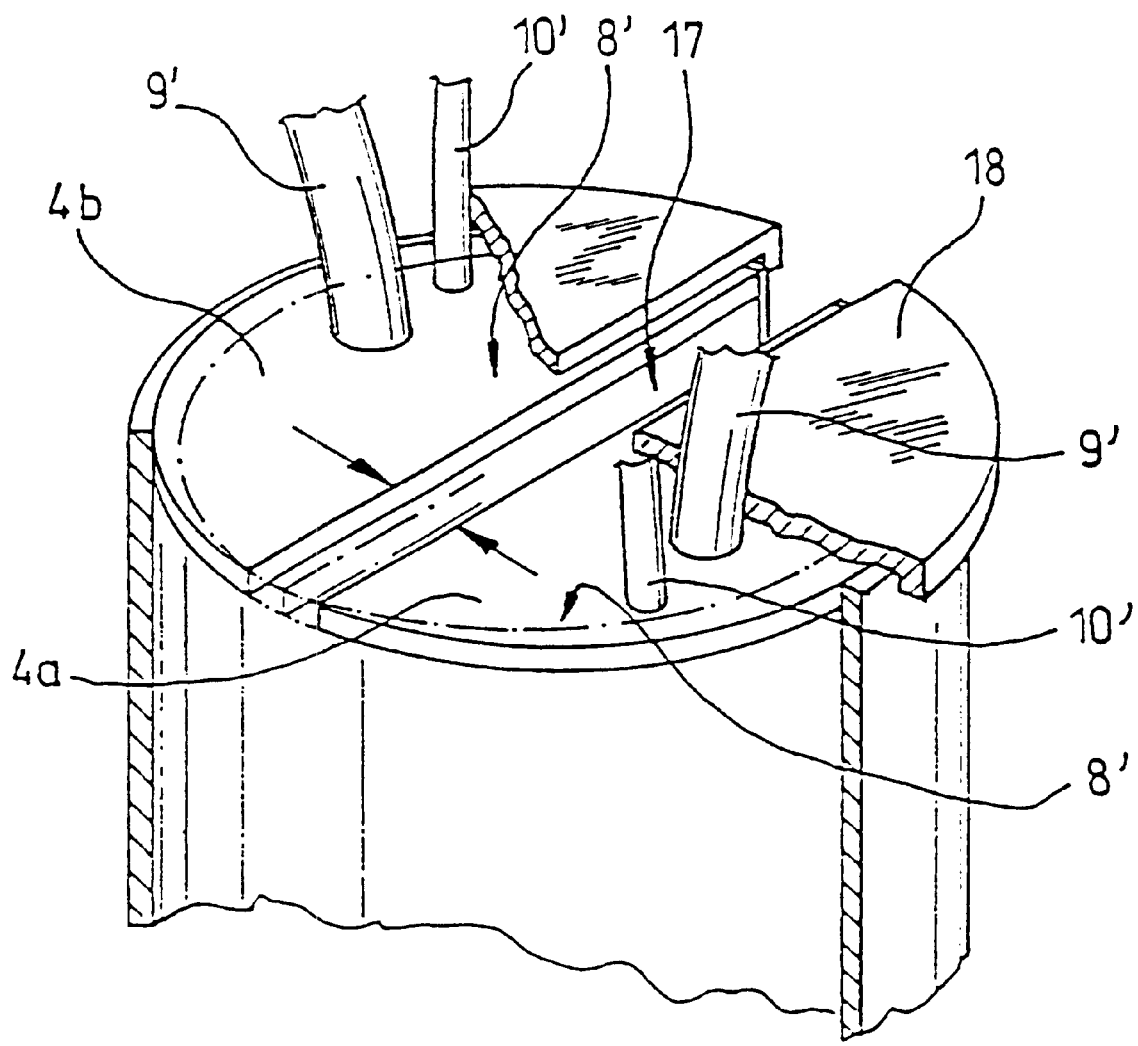
FIG. 2 is a schematic detailed perspective view of an embodiment of a ceiling section of the coating booth of FIG. 1.

As seen in FIGS. 1 and 2, the ceiling section 4 includes, for example, at least two segments 4a, 4b that are not connected with the peripheral wall 2, but separate therefrom. During the powder coating operation, the two segments 4a, 4b of the ceiling section 4 bound, for example, a through-slot 17 for a suspended gear of a conveyor (not shown), on which the parts to be coated are arranged and transported through the interior space 5 of the coating booth 1. This arrangement can be laid out so that the two segments 4a, 4b of the ceiling section 4 that form the ceiling of the coating booth 1 are moved towards one another, so that the slot 17 disappears during, for example, a cleaning operation. The dimensions of the two segments 4, 4b of the ceiling section 4 are smaller than the dimensions of the interior space 5, so that the two segments can move vertically to clean the interior space 5. Here too, the cleaning device 8' is installed in or additionally provided on such a ceiling section 4. When the cleaning device 8' is in a ready position or rest position, the segments 4a, 4b of the ceiling section 4 are located apart from one another so as to tightly seal the interior space 5 of the booth, preferably resting on the end face of the peripheral wall 2. For the coating operation, a through-slot 17 is again formed between the two segments 4a, 4b of the ceiling section 4. It will be understood that optionally additional seals can be provided between the ceiling section and the interior wall of the booth.

As seen more particularly in FIG. 2, a blowing device 9' and/or a suction device 10' can be associated with each of the segments 4a, 4b. By suitably designing the segments 4a and 4b, it may also be sufficient to associate only a single blowing device and/or suction device (not shown in detail) with the segments 4a, 4b of the ceiling section 4. With this arrangement, the two segments 4a, 4b are moved into a mutual communicating connection for cleaning. The blowing device and/or the suction device 4 is connected eccentrically with one of the segments 4a or 4b.

Preferably, there is provided on the side facing the ceiling and above the ceiling section 4 a closing plate 18, which advantageously surrounds the upper edge of the peripheral wall 2 when the segments 4a and 4b are moved closely together for cleaning the interior space 5 of a booth, so as to provide a tightly sealed termination on the top during the cleaning operation. If the segments 4a and 4b are spaced apart and form the through-slot 17, then the closing plate 18 can be optionally lifted on the top side of the coating booth 1, and preferably driven by the vertical movement of the ceiling section 4.

Although the coating booth 1 in the illustrated embodiment has a cylindrical shape and a circular cross-section, the invention is obviously not limited to this particular embodiment, and polygonal, four-cornered, square, rectangular, oval and other cross-sections can also be considered for the coating booth 1, including combinations thereof. For sake of simplicity, an exemplary coating booth 1 with a round cross-section is selected for illustration in the drawing. Preferred cross-sectional shapes are, for example, round-oval or flat-oval.

In the following, the floor section 3 will be described in detail with reference to FIG. 1.

The floor section 3 forms the floor of the coating booth 1 during the coating operation and is secured in its lowest position so that the interior space 5 of the coating booth 1 is tightly sealed. Optionally, a sealing element 7 can be provided below the floor element 3 which operates as an additional floor seal during the cleaning cycles.

As seen from the drawing, the floor section 3 preferably includes an integral cleaning device 8 which preferably includes a blowing device 9 and a suction device 10. Advantageously, the blowing device 9 includes blowing nozzles 11 which are uniformly spaced along the circumference for blowing the blast air onto the peripheral wall 2 during the cleaning operation. The suction device 10 preferably includes suction openings 12 which are also uniformly spaced along the circumference. In the illustrated example, the blowing device 9 and the suction device 10 are arranged with an axial spacing, wherein the blowing device 9 is arranged forward in the movement direction of the cleaning direction 8 which is formed by the floor section 3, whereas the suction device 10 is arranged in the trailing region. The order of the blowing device 9 and suction device 10 can also be reversed from the illustrated preferred embodiment. A suction line 14 in the form of a telescopic assembly is connected to the suction device 10. The suction line leads, for example, to a following filter and cyclone device (not shown). A hose 15 which can be wound onto a hose reel 16, can be connected to the blowing device 9 for supplying blast air. As shown schematically in FIG. 1 with reference to the floor-side suction device 10, a flap 20 which can be opened and closed as required, is arranged in the region of the suction line 14. For example, if a color change "tint-in-tint" is performed, then the excess powder removed during cleaning to can be recycled into the powder loop and, for example, supplied to the recovery unit (not shown) of the coating facility. In this case, the flap 20 in the suction line 14 is closed, and the excess powder removed during cleaning is supplied directly to the recovery device using a suction device that is disposed in the interior space of the booth (also not shown) and employed customarily during the coating operation. Such suction device operating during conventional coating operations can be implemented, for example, as a slot which extends over most of the length or the height of the coating booth. This suction system is typically connected with the recovery device or the associated recovery system to ensure economical powder consumption. In addition, in the region of the suction line 14, an inspection window and/or a cleaning flap (not shown) can be provided in the wall region of the suction line 14.

To clean the suction line 14 itself, a schematically illustrated slot 21 can be provided which can be closed with a removable cover. Suitable cleaning devices for cleaning also the floor-side suction device 10 can be inserted via this slot 21.

The detailed features described for the embodiments relating to the cleaning device 8 disposed on the floor section 3 can also be provided in an identical or similar fashion for the cleaning device 8' of the ceiling section 4 having the segments 4a and 4b.

For example, if the interior space 5 of the coating booth 1 is to be cleaned when the powder is being changed, then the floor section 3 and/or the ceiling section 4 is moved upwards and downwards vertically, as indicated by the arrow 13. The blast jets released via the nozzles 11 of the blowing device 9, 9' are directed against the interior wall of the peripheral wall 2 for the purpose of releasing the powder particles from the interior wall. The powder particles released by the cleaning operation from the interior wall 5 are then drawn in by the suction device 10, 10' as indicated by arrows. When the floor section 3 and/or the ceiling section 4 moves vertically in the direction of the arrow 13, the hose connection 15 of the blowing device 9, 9' and the suction line 14 of the suction device 10, 10' are automatically and uniformly carried along. In this way, powder can be removed from the interior space 5 efficiently and completely during the cleaning cycles. This type of cleaning is required, for example, during a color change. During the cleaning cycles, the sealing element 7 provides an additional seal of the interior space 5 on the floor side, thereby preventing powder from escaping into the environment. Similarly, the cover plate 18 on the ceiling side also provides a seal during cleaning. The cover plate 18 can also be segmented, with the segments being moved together for carrying out the cleaning operation.

When the cleaning operation is carried out with the cleaning device 8, 8', the floor section 3 and/or the ceiling section 4 is withdrawn to its respective initial position and remains locked in this position. In this way, the floor section 3 and/or the ceiling section 4, which are separate from the peripheral wall 2, form as intended the floor and/or the ceiling of the coating booth 1. The communicating connections between the blowing device 9, 9' and the associated supply device, and the suction device 10, 10' and the subsequent devices, respectively, are advantageously integrated into the floor section 3 and/or the ceiling section 4.

It will be understood that the invention is not limited to the aforedescribed embodiment, but that numerous changes and modifications will be apparent to those skilled in the art without departing from the spirit of the invention. In particular, the blowing device 9, 9' and the suction device 10, 10' of the cleaning device 8, 8' can be retractably disposed in the floor section 3 and the ceiling section 4. In this way, the cleaning device 8, 8' itself is protected during the coating operation by the floor section 3 and/or the ceiling section 4, thereby preventing contamination. Optionally, the cleaning device 8, 8' can also include additional stripper lips which strip the powder from the interior wall surface of the peripheral wall 2 by brushing across the wall surface. Additional brushing devices and the like can optionally be provided. Moreover, wet cleaning may also be performed which would require additional water supply facilities. It is also possible to combine these additional devices in the cleaning device 8, 8'. Furthermore, the cleaning device 8, 8' together with the floor section 3 and/or the ceiling section 4 can also be designed to controllably rotate about its axis. However, this would require suitable modifications of the connections for the blowing device 9, 9' and the suction device 10, 10' different from the illustrated embodiment.

Moreover, suitable actuating devices can be employed to drive the vertical movement of the floor section 3 and/or the ceiling section 4, as indicated by the direction of the arrow 13, and to perform the cleaning motion of the cleaning device 8, 8'. The actuating devices can be operated mechanically, hydraulically, pneumatically, electrically or by a combination of the above. Any suitable drive can be employed to move the floor section 3 and/or the ceiling section 4 together with the cleaning device 8, 8' in the interior space 5 upwards and downwards in the vertical direction 13.

Figure 3:
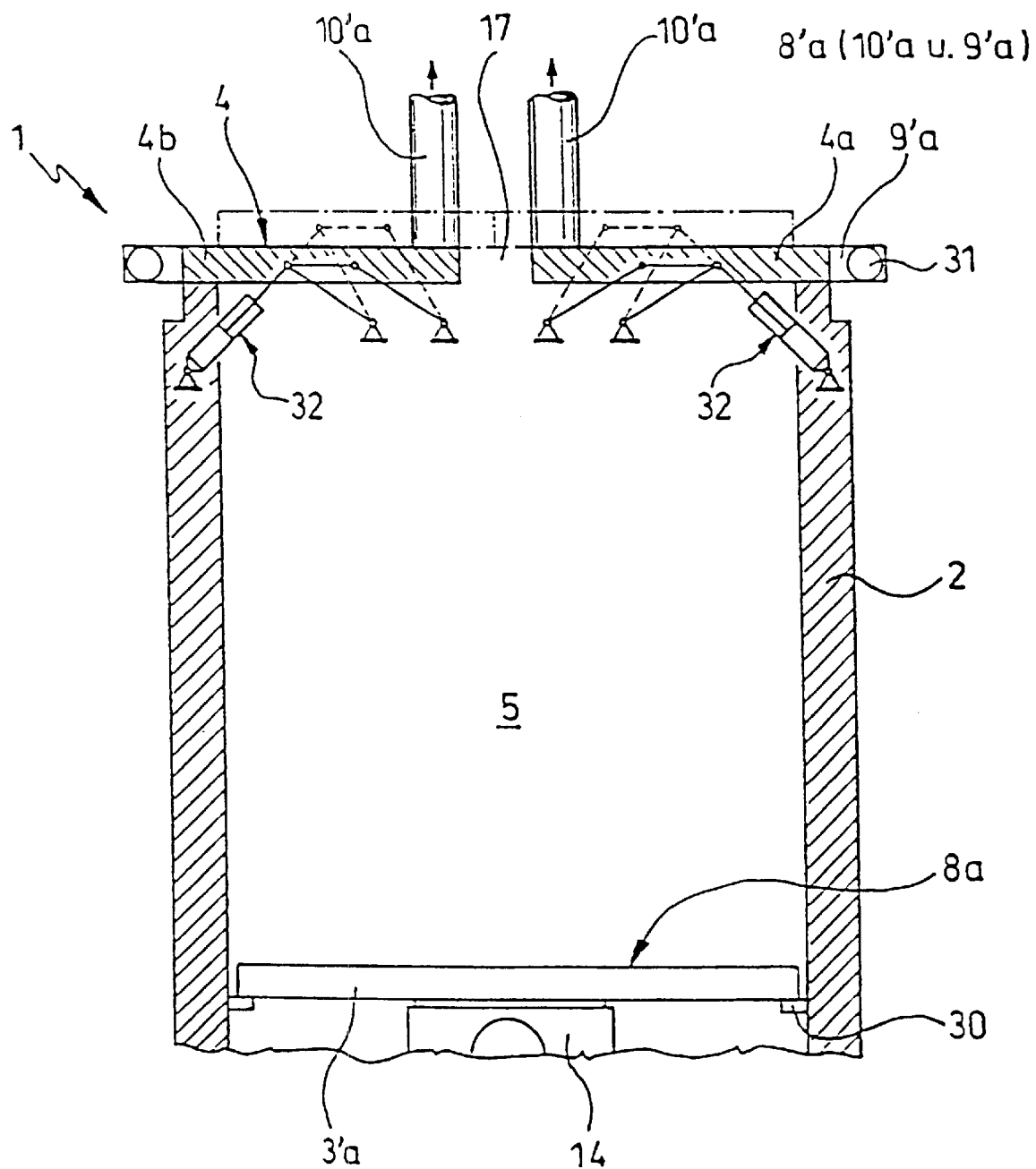
FIG. 3 shows schematically a detailed longitudinal cross-sectional view of an embodiment of the coating booth in a coating position.
Figure 4:
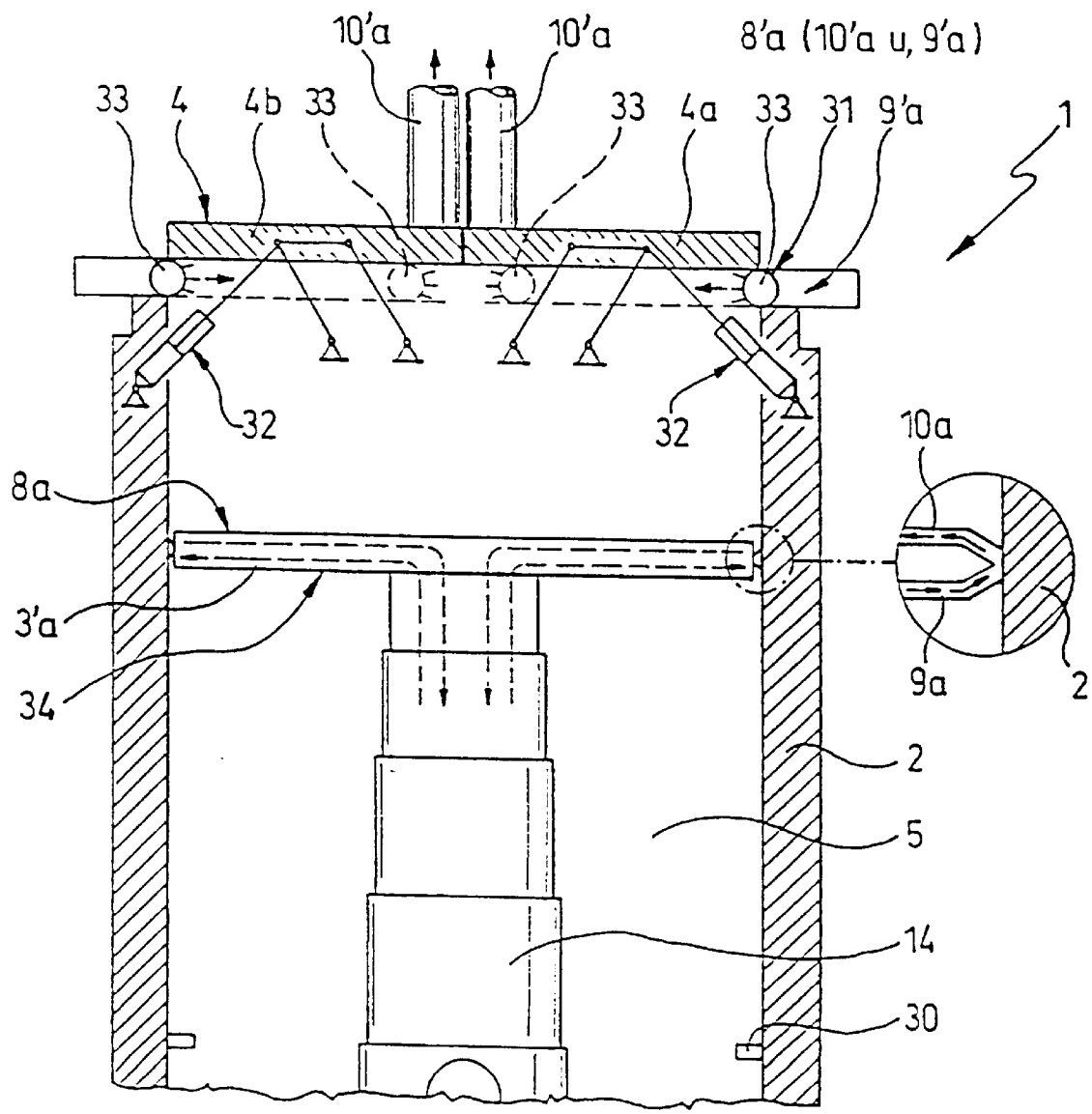
FIG. 4 schematically, a longitudinal cross-sectional view of the coating booth of FIG. 3, with the cleaning device in a cleaning position, and an enlarged in detail thereof.

FIGS. 3 and 4 illustrate a modified embodiment of a coating booth 1 wherein identical or similar elements have the same reference numerals. Accordingly, the identical or substantially identical elements will not be described in detail. The changes and modifications described above with reference to FIGS. 1 and 2 also apply in an identical or similar manner to the embodiment illustrated in FIGS. 3 and 4.

FIG. 3 shows schematically a longitudinal cross-section of the coating booth 1. The coating booth is here shown during coating operation. The floor section 3'a with the associated devices is constructed similar to the previous Figures. As illustrated, a projecting stop 30 is provided on the interior wall surface of the coating booth 1, with the floor section 3'a contacting the stop 30 in the conventional coating operation position. Optionally, conventional sealing systems can be provided (not shown) which reliably seal the interior space 5 of the booth from the lower region of the coating booth 1. The devices associated with the floor section 3'a, such as the cleaning device 8a, the blowing device 9a and the suction device 10a are indicated only schematically and are only partially visible; they are constructed essentially similar to the aforedescribed embodiments.

The modified embodiment illustrated in FIGS. 3 and 4 represents a combination of a cleaning device 8a that is associated with the floor section 3a and can be moved in the interior space of the booth 5 in a vertical direction, and a modified embodiment of a cleaning device 8'a associated with the ceiling section 4. The ceiling section 4 includes two segments 4a and 4b which in the operating position of the coating booth are spaced apart, thereby forming the through-slot 17, for example, for a suspended gear. The two segments 4a and 4b of the ceiling section 4 rest firmly and reliably on the upper edge of the peripheral wall 2. Suitable sealing systems can optionally be provided at this location. The cleaning device 8'a associated with the ceiling section 4 has, for example, the form of an annular element with a cross section matching the outer contour of the ceiling section 4. This cleaning device 8'a, shown in its rest position, is indicated in FIG. 3 by the reference numeral 31.

As seen in FIG. 4, an actuating device 30 is associated with the segments 4a and 4b, preferably in form of an articulated lever mechanism. This actuating device 30 to can be used to move the two segments 4a and 4b of the ceiling section 4 into the cleaning position indicated in FIG. 4, i.e., the segments 4a and 4b are slightly lifted and moved towards one another, so that the through-slot 17 of FIG. 3 is tightly closed. The reference numeral 10'a indicates the suction device for the ceiling section 4 which can be constructed as described above. The annular cleaning device 31, which in the cleaning position of the coating booth 1 (see FIG. 4) is disposed in the space between the slightly lifted segments 4a and 4b and the upper edge of the peripheral wall 2, includes several nozzle assemblies 33 which operates as blowing devices 9'a. As indicated schematically, blast air exiting the nozzle assemblies 33 is preferably directed to be incident on the lower sides of the segments 4a and 4b that face the interior space 5 for blowing off the excess powder. The excess powder is then withdrawn through the suction device 10'a by subsequent devices, as described with reference to the floor-side cleaning device.

When the floor-side cleaning device 8a is moved to its uppermost vertical position, the top side of the cleaning device 8a can also be almost completely and automatically cleaned by the cleaning device 8'a that is associated with the ceiling section 4. The embodiment described with reference to the FIGS. 3 and 4 hence makes it possible to automatically clean both the floor-side cleaning device 8a and the segments 4a, 4b of the ceiling section 4.

As depicted schematically in the enlarged detail in FIG. 4, the floor-side cleaning device 8a is formed like a nozzle plate 34 which forms the floor section 3'a. This nozzle plate 34 has nozzle openings distributed around the outer periphery for the blowing device 9a and the suction device 10a. As indicated schematically by the arrows representing the flow, the blast air after the cleaning device 8a—as viewed in the movement direction of the cleaning device 8a—is directed onto the corresponding wall surface of the interior space 5 of the booth. The corresponding suction nozzles of the suction device 10a immediately suction off the powder particles released from the wall by the blast air, thereby reliably preventing the powder particles released by the blast air from entering the space below the cleaning device 8a (see FIG. 4). Valves (not shown) can be used to control the corresponding blowing and suction air currents.

After the interior space 5 of the coating booth 1 has been cleaned, the segments 4a and 4b of the ceiling section 4 are once more moved apart by the actuating device 32 and slightly lowered onto the upper peripheral edge of the peripheral wall. The annular cleaning device 31 then moves again outwardly into its ready position, as indicated in FIG. 3. The through-slot 17 is also formed again between the segments 4a and 4b of the ceiling section 4.

It will be understood that the annular cleaning device 31 can be modified from the embodiment illustrated in FIGS. 3 and 4. The same applies to the nozzle devices 33. The actuating device 32 can also be implemented differently.

It is significant in the preferred embodiment illustrated in FIGS. 3 and 4 that a cleaning device 8'a associated with the ceiling section 4 can be used to automatically clean both the ceiling section 4 as well as the floor section 3'a. Of course, in this modified embodiment depicted in FIGS. 3 and 4, devices identical or similar to those of the previously described embodiments can also be provided.

FIGS. 5 and 6 are intended to describe an alternative embodiment of a coating booth which is based on the embodiment of FIG. 4, but differs in the cleaning process for the space between the ceiling section and the floor section. The basic design and details of the coating booth as well as of the floor section 3'a and the corresponding ceiling section 4, which includes the two segments 4a and 4b, are essentially identical to the embodiment depicted in FIG. 4. The details will therefore not be described here. All suction devices 10'a of FIG. 4 which communicate with the ceiling section 4, are completely eliminated.

As shown in FIG. 5, the coating booth includes a ceiling cleaning device 50 associated with the ceiling section 4. This ceiling cleaning device 50 in the embodiment of FIG. 5 includes compressed air nozzles 51, which are adjusted to direct a compressed air current onto the corresponding regions of the ceiling section and the floor section. The ceiling cleaning device 50 also includes a suction device 52 which suctions off the cleaning air originating from the compressed air nozzles 51 and the entrained powder. For this purpose, for example, one or several suction hose connections 52 can be provided on the ceiling cleaning device 50. The ceiling cleaning device 50 is preferably suspended from a telescopic rail arrangement and can thereby be moved in the entire space between the ceiling section 4 and the floor section 3, 3'a parallel to the space, i.e., in a longitudinal direction. The necessary drives to effect this movement which can be conventional drives, are not shown in FIGS. 5 and 6. Accordingly, the ceiling cleaning device 50 provides that the powder blown off with the help of the compressed air exiting from the compressed air nozzles 51 is immediately drawn off through the suction device 52 of the ceiling cleaning device 5. The pathways between the compressed air nozzles 51 and the entrance to the suction device 52 are therefore quite short, ensuring an effective operation of the ceiling cleaning device 50. The suction device 52 can also include one or more suction hose connections 53 disposed on the ceiling cleaning device 50, which can be preferably controllably connected to a secondary filter of a powder recovery facility (not shown) using flaps 54. The suction device 52 can also be connected to subsequent devices, such as cyclone devices and the like.

In the embodiment of a coating booth according to FIG. 6, unlike the embodiment depicted in FIG. 5, the ceiling cleaning device 50 includes two cleaning units 55 which are constructed to match the aforedescribed ceiling cleaning device 50. The cleaning units 55 can be moved independently of one another along telescopic rails in the space formed between this ceiling section 4 and the floor section 3, 3'a. Accordingly, each cleaning unit 55 covers only approximately half the region to be cleaned between the ceiling section 4 and the floor section 3, 3'a.

It should be noted with particularity that with the preferred embodiment of the ceiling cleaning devices 50 depicted in FIGS. 5 and 6, the suction devices 10'a disposed on the respective segments 4a, 4b can be eliminated. This simplifies, in particular, the design of the ceiling regions of a coating booth according to the invention, thereby providing a compact ceiling cleaning device 50 and a cleaning booth with a small overall height.

Although not described in detail above, the coating booth can also be operated during a coating operation by using the suction both on the floor and/or the ceiling. For example, when slot-like suction devices that extend along the booth length are provided for the coating operation, then the floor and/or ceiling of the cleaning device can be designed so that the slot-like suction devices that extend in the longitudinal direction of the booth can be cleaned simultaneously.

While the invention has been illustrated and described as embodied in a coating booth, in particular a powder coating booth with a cleaning device, and method for cleaning the same, it is not intended to be limited to the details shown since various modifications and structural changes may be made without departing in any way from the spirit of the present invention.

What is claimed is:

1. A powder coating booth, comprising:
   a peripheral wall extending in a longitudinal direction;
   a floor and a ceiling cooperating with the peripheral wall to bound an interior space of the coating booth;
   a cleaning device movable in the longitudinal direction and adapted to clean the interior space of the coating booth;
   wherein at least one of the floor and ceiling is formed as a floor section or ceiling section, respectively, separate from the peripheral wall and also includes the cleaning device.

2. The coating booth of claim 1, wherein the cleaning device is integrated in the respective floor section or ceiling section.

3. The coating booth of claim 1, wherein the floor section or ceiling section are moveable in the longitudinal direction for cleaning the interior space of the booth.

4. The coating booth of claim 1, wherein the cleaning device includes a blowing device and a suction device.

5. The coating booth of claim 4, wherein the blowing device and the suction device are spaced apart in the longitudinal direction of the coating booth.

6. The coating booth of claim 4, wherein on the cleaning device, the blowing device is disposed forward and the suction device is disposed rearward when the cleaning device moves in a direction for cleaning the interior space of the coating booth.

7. The coating booth of claim 4, wherein the blowing device and the suction device are formed as a nozzle plate, with the nozzle plate of the suction device operating in a region of the peripheral wall proximate to a wall impact region of blast air emerging from the blowing device.

8. The coating booth of claim 4, wherein the blowing device includes a plurality of nozzles which are distributed along a periphery of the blowing device.

9. The coating booth of claim 4, wherein the suction device includes a plurality of suction openings which are distributed along a periphery of the suction device.

10. The coating booth of claim 1, wherein the floor section and/or ceiling section includes a sealing element.

11. The coating booth of claim 1, wherein at least one of the floor section and the ceiling section comprises at least two segments which are movable in the longitudinal direction and are moved towards one another in a transverse direction for cleaning the interior space of the coating booth.

12. The coating booth of claim 11, wherein the ceiling section includes a blowing device in the form of a blowing ring adapted to the cross-section of the coating booth, with the blowing ring facing the interior space when the segments of the ceiling section are moved towards one another for cleaning the interior space.

13. The coating booth of claim 12, further including an actuating device that moves the segments of the ceiling section towards one another for cleaning the interior space and is capable of lifting the segments from an upper edge of the peripheral wall.

14. The coating booth of claim 13, wherein the actuating device is implemented as an articulated lever mechanism.

15. The coating booth according to claim 1, wherein at least one of the floor section and the ceiling section comprises at least two segments which are moved apart from each other in a transverse direction during a coating operation so as to bound a pass-through slot.

16. The coating booth of claim 4, further comprising a secondary device connected to the suction device and selected from the group consisting of a cyclone device, a secondary filter device and a recovery device, wherein the connection between the suction device and the secondary device includes a controllable flap.

17. The coating booth of claim 1, wherein the ceiling section includes at least one ceiling cleaning device having nozzles for discharging compressed air to dislodge powder adhering to the peripheral wall, and at least one suction device disposed in the ceiling cleaning device for withdrawing the dislodged powder, wherein the at least one ceiling cleaning device is adapted to clean the space between the respective ceiling and floor sections.

18. The coating booth of claim 17, wherein the at least one ceiling cleaning device includes one or more suction hose connections for connecting the suction device.

19. The coating booth of claim 17, further including a powder recovery device with a secondary filter, wherein the suction device is connected to the secondary filter.

20. The coating booth of claim 19, wherein the connection between the suction device and the secondary filter includes a controllable flap.

21. The coating booth of claim 17, wherein the at least one ceiling cleaning device is disposed on a telescopic rail for movement between the respective ceiling and floor sections.

22. The coating booth according to claim 17, wherein the at least one ceiling cleaning device includes two cleaning units, with each of the cleaning units cleaning a half space extending in the longitudinal direction between the respective ceiling and floor sections.

23. The coating booth according to claim 22, wherein each of the cleaning units is disposed on an independent telescopic rail for movement between the respective ceiling and floor sections.

24. The coating booth of claim 4, wherein on the cleaning device, the blowing device is disposed rearward and the suction device is disposed forward when the cleaning device moves in a direction for cleaning the interior space of the coating booth.

* * * * *